Sept. 10, 1968  E. C. HARTUNG  3,401,328
BRUSHLESS SYNCHRONOUS MACHINE SYSTEM
Filed May 20, 1966  3 Sheets-Sheet 1

FIG. I

INVENTOR.
EDWARD C. HARTUNG
BY
HIS ATTORNEY

Sept. 10, 1968  E. C. HARTUNG  3,401,328
BRUSHLESS SYNCHRONOUS MACHINE SYSTEM
Filed May 20, 1966  3 Sheets-Sheet 2

INVENTOR.
EDWARD C. HARTUNG
BY James C. Davis Jr.
HIS ATTORNEY

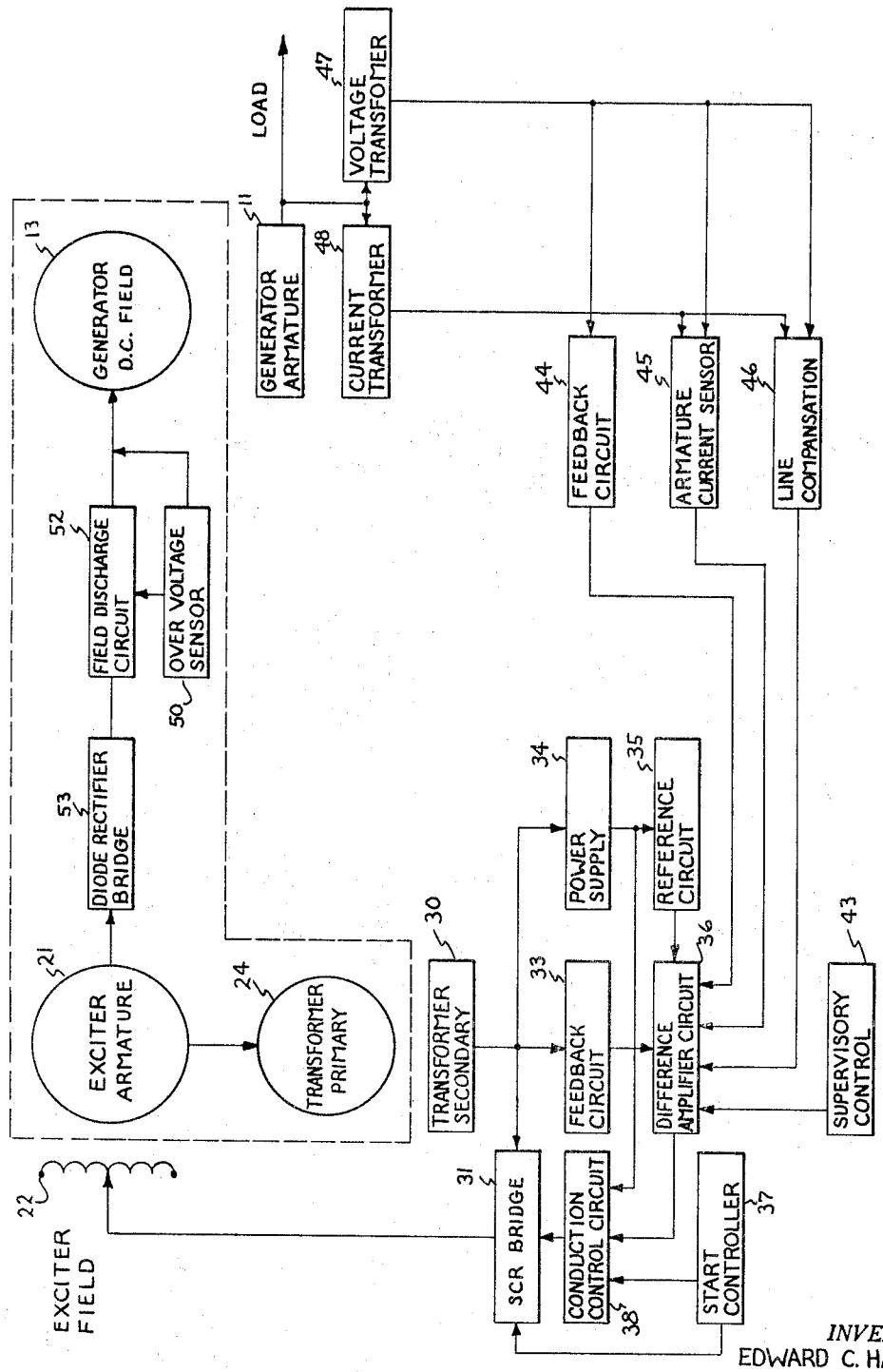

United States Patent Office 3,401,328
Patented Sept. 10, 1968

3,401,328
BRUSHLESS SYNCHRONOUS MACHINE SYSTEM
Edward C. Hartung, Elnora, N.Y., assignor to General
Electric Company, a corporation of New York
Filed May 20, 1966, Ser. No. 551,614
12 Claims. (Cl. 322—28)

The present invention relates to a control system for synchronous machines and, more particularly, to a control system of the type referred to as a brushless system.

A synchronous machine is a form of dynamoelectric machine which may be used as a motor for driving a shaft at a predetermined constant speed or as a generator for producing a voltage of a predetermined frequency. Whether the machine is used as a motor or a generator, its field winding which is provided on the rotor will normally rotate at a speed referred to as the synchronous speed of the machine. In the case of a synchronous motor, either a separate induction motor or induction windings incorporated into the synchronous motor are relied on for starting and accelerating the motor to synchronous speed. In the case of a synchronous generator, a separate prime mover, such as a steam or water turbine, is relied on for starting and accelerating the generator to synchronous speed. Upon reaching the synchronous speed, direct current is applied to the rotor field winding. In a motor, the D-C field causes the rotor to "lock" on and rotate at the same speed as the field established in the stator. In a generator, the D-C field establishes a flux which will cause voltages to be induced in the stationary armature windings when the rotor is being driven.

In brushless synchronous machines, an exciter or A-C generator is provided with its armature mounted on the same shaft as the field winding of the synchronous machine. The output from the exciter armature is rectified by shaft mounted rectifiers which then deliver the rectified current to the field winding of the synchronous machine. Before a voltage will be induced in the rotating armature of the exciter, direct current must be supplied to its stator field winding. In the past, the direct current has been supplied from external power lines which have also provided power for control systems used to regulate the operation of the synchronous machine and exciter. In many applications, it is desirable or even necessary that this dependence upon external power lines be eliminated so that the system is self-contained. In this way, ability of the machine to survive external power supply failures is enhanced, promoting greater reliability.

It is accordingly one object of the present invention to provide a control system for a synchronous machine which can be completely self-contained.

It is another object of the present invention to provide a self-contained synchronous machine system wherein all brushes, slip rings, and other stationary-to-rotary electrical contacts have been eliminated.

It is a further object of the present invention to provide a self-contained, brushless synchronous machine system for regulating the output of the synchronous machine and the output of the exciter.

It is a still further object of the present invention to provide a self-contained synchronous machine system, including a plurality of dynamoelectric machines having their rotating windings mounted on the same shaft.

To fulfill these and other objects of the present invention, there is provided in one embodiment a self-contained exciting system adapted for use with a dynamoelectric machine having a rotating field winding and a stationary armature winding. The exciting system includes a generator having a stationary field winding and an armature winding adapted to rotate with the field winding of the dynamoelectric machine. A portion of the output of the exciting generator is delivered to the rotating primary winding of an inductor having a stationary secondary winding inductively coupled to the rotatable primary winding. At least part of the electric power induced in the stationary secondary winding of the inductor is rectified and is applied across the stationary field winding of the exciting generator, thereby providing the field power for the generator to cause an increase in the magnitude of its output.

In a particular embodiment of the present invention, a portion of the voltage developed in the secondary winding serves as a source of power for a control system used for regulating the operation of the dynamoelectric machines.

While the specification concludes with claims particularly pointing out and distinctly claiming that which is regarded as the present invention, the organization, advantages, and further objects of that invention may be more readily ascertained from the following detailed description when read in conjunction with the accompanying drawings in which:

FIGURE 3 is a block diagram of an alternate embodiment of a control system for use in accordance with the present invention.

Figure 1:
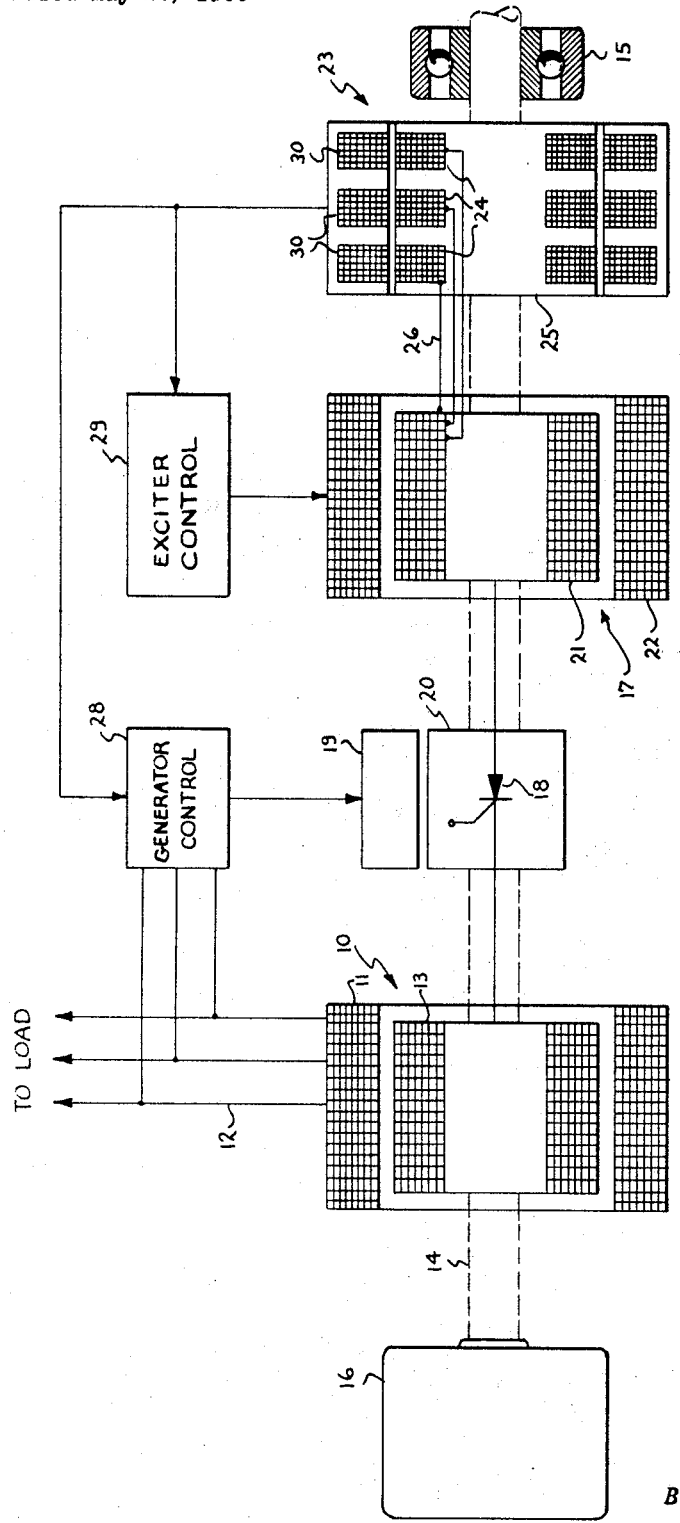
FIGURE 1 represents a greatly simplified sectional view of the dynamoelectric machines included within the system of the invention, including schematic representations of the connections between the various machines.

Referring now to FIGURE 1, there is shown a greatly simplified sectioned view of a self-contained synchronous generator system, including control circuits represented in block diagrams. The system includes a synchronous generator 10 having a stationary armature winding 11 formed by three individual windings interconnected to provide a three-phase output at leads 12. The generator 10 further includes a direct-current field winding 13 fixedly mounted on a rotatable shaft 14 shown in dotted lines, which may be journaled at one end in a set of bearings 15 and driven at the other end by a prime mover 16. The field winding 13 of the synchronous generator 10 is connected to the output of an A-C generator or exciter 17 through a rectifier arrangement or bridge 18 mounted for rotation on the shaft 14. In FIGURE 1, this arrangement or bridge 18 is represented by the schematic drawing of a silicon-controlled rectifier which is switched between its conductive and nonconductive states by a control signal transmitted to a rotating receiver 20 from a stationary transmitter 19 adjacent the shaft 14, although other kinds of thyristors are equally advantageously employed in most cases.

The output voltage of the exciter 17 is provided by a rotating exciter armature 21 which is driven by the prime mover 16 relative to a stationary D-C field winding 22. While most of the voltage developed in the armature 21 is applied across the field winding 13 of the generator 10 through the bridge 18, a small part of that output is applied across the primary windings 24 of a three-phase rotating power transformer 23. The three-phase primary windings 24 are mounted on a single rotatable core 25 which is secured on the shaft 14. Although the electrical connections between the primary windings 24 and the armature 21 are represented schematically in FIGURE 1 by conductors 26 spaced from the shaft 14, in actual practice the conductors 26 may be secured to the shaft surface or if the shaft is hollow can be contained within it. The voltages established across the rotating primary windings 24 induce voltages in completely separate stationary secondary windings 30. These induced secondary voltages supply power for a generator field power control circuit 28 and an exciter field power control circuit 29.

Figure 2:
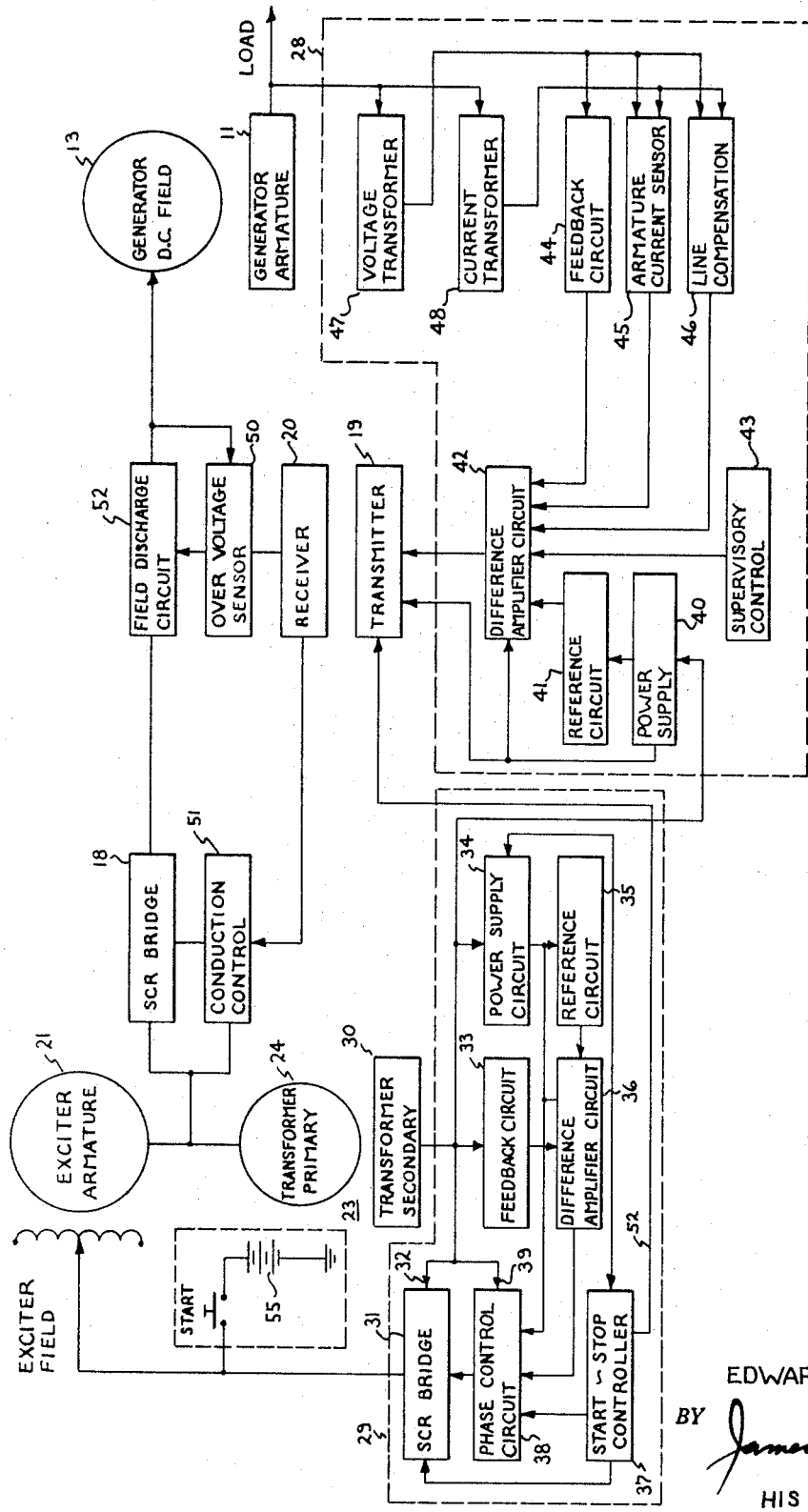
FIGURE 2 is a block diagram showing the elements of a control system for use in accordance with the present invention.

The control system shown schematically in FIGURE 1 is greatly simplified and is intended primarily to show the physical relationships of the various machines and the concept of the closed loop excitation system. FIGURE 2 discloses in more detail the control systems generally depicted in FIGURE 1. In FIGURE 2, certain blocks represent specific elements also disclosed in FIGURE 1. These elements are denoted by the same numerals as were used in discussing them previously.

A major portion of the output power from the transformer secondary windings 30 is selectively reapplied to the field winding 22 through an SCR bridge circuit 31 having an input terminal 32. The remainder is applied to the exciter control circuit 29 which includes a feedback circuit 33, a power supply 34, a reference signal circuit 35, a difference amplifier circuit 36, a start controller circuit 37, and a conduction control circuit 38. The transformer secondary voltage is applied directly to the phase control circuit 38 at an input terminal 39 to provide an alternating-current voltage necessary to the operation of that circuit. Similarly, the secondary voltage is applied directly to the feedback circuit 33, which provides a D-C output signal representative of the exciter output level, and to a power supply circuit 34 which provides a D-C output voltage suitable for use as operating voltages for the electronic components within the reference signal circuit 35, the difference amplifier circuit 36, the start controller circuit 37, and the phase control circuit 38. The output of the reference signal circuit 35 is a D-C signal having a magnitude which is independent of any variations in the magnitude of the voltage of the transformer secondary 30, but which may be varied, or set, by an operator to change the output voltage level of the exciter. This D-C signal is applied to the difference amplifier circuit 36 where it is compared to a D-C output signal from the feedback circuit 33. A D-C difference signal from the difference amplifier circuit 36 is applied to the phase control circuit 38 in addition to the A-C phase reference voltage provided at the input terminal 39. The resultant relatively timed pulses from circuit 38 control the conduction angle of the rectifiers in the bridge circuit 31, as set forth in the General Electric Controlled Rectifier Manual, First Edition, at Chapter 4, for example, thereby controlling the strength of the exciter field 22 in response to the sensed D-C voltage and consequently providing a substantially constant output voltage for the exciter armature 21.

The start-stop controller circuit 37 provides continuous firing signals to SCR bridge 31 during initial start-up and causes the phase control circuit to provide firing pulses yielding essentially zero conduction of the bridge 31 during shutdown. During normal operation, controller 37 does not affect system performance.

In the system disclosed in FIGURE 2, the voltage developed in the secondary winding 30 of the transformer 23 is also used to supply power to the generator control circuit 28 through a power supply circuit 40 which suitably alters the secondary voltage so that it provides operating voltages for a reference circuit 41, a difference amplifier circuit 42, and a transmitter 19. The reference circuit 41 in the generator control 28 is similar to the reference circuit 35 in the exciter control 29 in that both produce a D-C signal having a fixed magnitude which is independent of any variation in the voltage of the transformer secondary windings 30 and which may be varied by an operator. The output signal of the reference circuit 41 provides one input signal to the difference amplifier circuit 42. The other signals to the difference amplifier circuit 42 are provided by a supervisory control circuit 43, a feedback circuit 44, an armature current sensor circuit 45, and a line compensation circuit 46. The supervisory control circuit 43 is provided to allow control of the generator in accordance with some criteria other than the generator output or the load characteristics. For example, the supervisory control circuit 43 may be connected to a digital computer to allow the generator to be controlled in accordance with a predetermined computer program.

The output of the generator armature 11 is detected and is transformed to suitable levels in a voltage transformer 47 and a current transformer 48 before being applied to the feedback circuit 44, the armature current sensor circuit 45 and the line compensation circuit 46. Since the feedback circuit 44 senses only the magnitude of the voltage output of the generator armature, the output of the current transformer 48 is not supplied to this circuit. However, the output of the voltage transformer 47 and the current transformer 48 are applied to the armature current sensor circuit 45 to provide an output useful for limiting the extent of current lag in the generator armature 11, for example, during operation with an underexcited field. The line compensation circuit 46 is used to sense changes in the characteristics of the load which the generator serves, providing line compensation adjusted for power factor changes. The changes in these variables provide corresponding input signals to the difference amplifier circuit 42, the output of which is a D-C signal having a magnitude and polarity normally indicative of the changes which must be made in the strength of the generator D-C field 13 in order to maintain a substantially fixed output voltage from the generator armature 11, and more particularly at the load served. When the generator 10 is to be controlled in accordance with a computer program, the changes in the D-C field strength which must be made are those which would result in a generator armature current which meets the requirements of the program.

In at least one embodiment of the present invention, the transmitter 19 provides high frequency control signals which are transmitted across an air gap to the receiver circuit 20 mounted on the shaft 14. Slip rings could be used for this purpose. The signals are amplified within the receiver circuit 20 and are applied to a conduction control circuit 51, that can be as phase control circuit 38, which also receives a signal directly from the output of the exciter armature 21. The signals from the receiver circuit 20 and the exciter armature 21 are provided to the conduction control circuit 51 to yield relatively phase-shifted pulses for the SCR rectifier arrangement, or bridge 18. The control signal establishes the conduction angle of the controlled rectifiers within the bridge 18 which, in turn, controls the strength of the generator D-C field and the magnitude of the voltage produced in the generator armature 11 as indicated by the output from the difference amplifier circuit 42.

Under normal operating conditions, a field discharge circuit 52 interposed between the bridge 18 and the generator field 13 will have no effect. However, in the event that the induced field currents in the generator field cause a voltage exceeding a predetermined level, this is detected by an overvoltage sensor circuit 50 which actuates the field discharge circuit 52 to cause that circuit to short circuit the generator field 13. At the same time, the overvoltage sensor circuit 50 provides a signal which results in the inhibiting of the control signal applied to the SCR bridge 18 through the conduction control circuit 51 so that the bridge 18 becomes substantially non-conducting.

When the above-described system is to be used for generating an A-C voltage, it operates in the following manner. The mechanical prime mover 16 drives the shaft 14 so that the field winding 13, the transformer primary windings 24, and the exciter armature 21 are rotating relative to their respective stationary windings. An initial residual voltage is induced in the armature 21 of the exciter 17, preferably with the aid of a battery 55 or permanent magnets in the exciter field windings 22. Once the shaft 14 begins rotating, an operator manipulates the start controller circuit 37 through the use of a push button or similar means that could be automatic to provide a firing signal to the SCR bridge 31 which allows the bridge 31 to conduct a part of the armature voltage back to the exciter field 22. At the same time, the start circuit 37 provides a signal through a line 52 which inhibits any conduction through the SCR bridge 18 to prevent premature excitation of the generator 10.

When the exciter 17 has raised itself to a desired operating level through the closed loop described above the start-stop controller, circuit 37 is automatically or manually disabled and at this point, the control of the exciter 17 becomes automatic. The inhibiting signal to the SCR bridge 18 is thereafter automatically or manually discontinued to cause the rectifiers in the bridge 18 to conduct current to the generator field 13 in accordance with signals received from the difference amplifier circuit 42 of the generator control 28.

The exciter control 29 will maintain a predetermined set output voltage at the terminals of the exciter armature 21. Also, if no signal is received in the difference amplifier circuit 42 from the supervisory control circuit 43, the generator control 28 maintains the output of the generator armature 11 at a substantially constant set value.

When the generating operation is to be halted, the start-stop controller circuit 37 can be manually or automatically reactivated to provide a signal which is applied to the phase control circuit 38 to cause the SCR bridge 31 to substantially stop conducting so that the transformer secondary voltage is not applied across the exciter field 22. At the same time, a signal is applied on line 52, which inhibits conduction of the SCR bridge 18. The exciter field and armature voltages and the generator field and armature voltages will fall off to zero or to a negligible residual level so that no voltages will be generated even though the shaft 14 continues to be driven by the prime mover 16.

The above-described system is especially adapted for use where it is desired that the generator be controlled independently of the exciter. Generally, the generator response is faster where the exciter voltage is maintained at a rated value and the conduction between the exciter and the generator is made variable. However, where response speed is not critical, the circuit disclosed in FIGURE 3 may prove quite suitable. With one exception, the components shown in FIGURE 3 are the same as those shown in FIGURE 2 and have been denoted by the same numerals as were used in FIGURE 2. The exception is that the SCR bridge 18 revealed in FIGURE 2 has been replaced in FIGURE 3 by a diode rectifier bridge 53. The sole function of the diode rectifier bridge 53 is to convert the A-C output of the exciter armature 21 into a D-C voltage before it is applied across the field 13 of the generator 10. Since no control signals are transmitted to the diode rectifier bridge 53, that portion of the generator and transmission has been eliminated. Specifically, the difference amplifier circuit 42, the reference circuit 41, the power supply circuit 40, and the supervisory control circuit 43 have been eliminated. The outputs from the feedback circuit 44, armature current sensor circuit 45, and line compensation circuit 46 are applied to the difference amplifier circuit 36 in the exciter control 28 along with the signals from the reference circuit 35 and the feedback circuit 33. The resulting signals are applied through the phase control during a variable part of each cycle. By controlling the conduction time of the bridge 31, the strength of the exciter field winding 22 may be varied to maintain the output of the generator armature 11 at a substantially fixed magnitude.

Although all of the discussion above has dealt with the use of the self-contained control system with a synchronous generator, it is apparent that the same basic system could be used with a synchronous motor to reduce the number of connections to external power sources. If the prime mover 16 were eliminated and if an A-C voltage source were added to establish a rotating field in the armature 11, the closed loop between the exciter 17 and the rotating transformer 23 would provide the D-C current for the field 13 just as if the machine were being used as a generator.

Also, is should be understood that the system including the closed loop between the exciter and the rotating transformer may be regulated by control circuits having functional sections arranged differently from those shown in FIGURES 2 and 3. Further, while the system described includes three-phase windings, the invention may be used in systems such as single or dual-phase systems.

While there has been described at present what are regarded as preferred embodiments of the present invention, variations and modifications may occur to those skilled in the art. Therefore, it is intended that the appended claims shall cover all such variations and modifications as shall fall within the true spirit and scope of the invention.

What I claim as new and desire to secure by Letters Patent of the United States is:

1. For use with a dynamoelectric machine having a rotating field winding and a stationary armature winding, a self-contained exciting system comprising:
    (a) an exciting generator having a stationary field winding and an armature winding adapted to rotate with the field winding of the dynamoelectric machine;
    (b) first conductor means adapted to electrically connect said armature winding of said generator to the field winding of the dynamoelectric machine, said means being adapted to rotate with said armature winding;
    (c) inductor means having a stationary secondary winding and a primary winding adapted to rotate with said armature winding;
    (d) second conductor means connecting a portion of said armature winding to said primary winding; and
    (e) third conductor means for electrically connecting said secondary winding to said field winding of said exciting generator.

2. A self-contained exciting system as recited in claim 1 and further including driving means for rotating the aforementioned rotatable windings.

3. A self-contained exciting system as recited in claim 2 wherein said exciting generator is associated with means for creating a residual flux in said stationary field winding which will cause a voltage to be induced in said armature winding when said armature winding is rotated by said driving means.

4. A self-contained exciting system as recited in claim 1 wherein said first conductor means includes unidirectional switching means for controlling the output of said armature winding whereby a direct current of a variable magnitude may be applied across the field winding of the dynamoelectric machine.

5. A self-contained exciting system as recited in claim 4 wherein said third conductor means includes rectifying means for converting the A-C output voltage of said secondary windings to a D-C voltage before it is applied across said stationary field winding.

6. The combination of:
    (a) a dynamoelectric machine having a stationary armature winding and a field winding mounted on a rotatable shaft;
    (b) an excitng generator having a stationary field winding and an armature winding mounted on said shaft;
    (c) controllable switching means mounted on said shaft for selectively connecting at least part of the output of said generator to said field winding of said dynamoelectric machine;
    (d) inductor means having a stationary secondary winding and a primary winding mounted on said shaft;
    (e) conductor means electrically connecting said primary winding to a portion of said armature winding of said generator; and (f) rectifying means connecting the output of said secondary winding to said field winding of said generator.

7. The combination as recited in claim 6 and further including means for operating said controllable switching means including:
(a) a power source for said operating means, said source being electrically connected to a portion of said secondary winding of said inductor means;
(b) sensing means for detecting the output of said dynamoelectric machine and for converting the detected information into a usable electrical signal;
(c) a reference circuit for producing a reference electrical signal;
(d) circuit means for comparing the electrical signal produced by said reference circuit with the usable electrical signal produced by said sensing means to yield a control signal; and
(e) means for applying said control signal to said controllable switching means.

8. The combination as recited in claim 7 wherein said means for applying the control signal to said controllable switching means includes a stationary radio transmitter for transmitting a frequency modulated radio signal and a radio receiver mounted on said shaft for receiving the radio signal.

9. The combination of:
(a) a dynamoelectric machine having a stationary armature winding and a field winding mounted on a rotatable shaft;
(b) an exciting generator having a stationary field winding and an armature winding mounted on said shaft;
(c) rectifying means mounted on said shaft for connecting at least part of the output of said generator to said field winding of said dynamoelectric machine;
(d) inductor means having a stationary secondary winding and a primary winding mounted on said shaft;
(e) conductor means electrically connecting said primary winding to a portion of said armature of said generator;
(f) controllable switching means for connecting the output of said secondary winding to said field winding of said generator.

10. The combination as recited in claim 9 and further including means for operating said controllable switching means to vary its conductivity, said last-named means including:
(a) a power source electrically connected to a portion of said secondary windings of said inductor means;
(b) sensing means for detecting the output of said dynamoelectric machine and for converting the output into a usable electrical signal;
(c) a reference circuit for producing a reference electrical signal;
(d) circuit means for comparing specific properties of said reference electrical signal with said usable electrical signal to yield a control signal; and
(e) means for applying the control signal to said controllable switching means.

11. The combination of:
(a) a rotatable shaft;
(b) a synchronous generator having a stationary armature winding and a field winding fixedly mounted on said rotatable shaft;
(c) an exciting generator having a stationary field winding and an armature winding fixedly mounted on said rotatable shaft;
(d) first controllable switching means fixedly mounted on said rotatable shaft for selectively connecting at least part of the output of said exciting generator to said field winding of said synchronous generator;
(e) synchronous generator control means for controlling the conductivity of said first controllable switching means;
(f) inductor means having a stationary secondary winding and a primary winding fixedly mounted on said rotatable shaft;
(g) conductor means electrically connecting said primary winding to a portion of said armature winding of said synchronous generator;
(h) second controllable switching means for selectively connecting at least a part of the output of said secondary winding across said field winding of said exciting generator;
(i) exciting generator control means for controlling the conductivity of said second controllable switching means;
(j) power means for energizing both said synchronous generator control means and said exciting generator control means; and
(k) second conductor means connected across at least part of said secondary winding of said inductor for applying at least part of the voltage induced in said secondary winding to said power means.

12. The combination of:
(a) a dynamoelectric machine having a stationary armature winding and a field winding mounted for rotation on a rotatable shaft;
(b) an exciter generator having a stationary field winding and an armature winding mounted for rotation on said shaft;
(c) rectifying means rotatable with said shaft connecting the armature winding of said exciter generator to the field winding of said dynamoelectric machine; and
(d) means including controllable switching devices coupling the armature winding of said exciter generator to the field winding of said exciter generator to provide the sole source of excitation power therefor.

References Cited

UNITED STATES PATENTS

| | | | |
|---|---|---|---|
| 3,132,297 | 5/1964 | Erikson | 322—59 |
| 3,200,323 | 8/1965 | Faulkes | 322—59 X |
| 3,290,582 | 12/1966 | Roosma et al. | 322—73 X |

ORIS L. RADER, *Primary Examiner.*

H. HUBERFELD, *Assistant Examiner.*